United States Patent Office 2,760,980
Patented Aug. 28, 1956

2,760,980
SUBSTITUTED NAPHTHALENES

Ferdinand C. Meyer and Angelo J. Speziale, Kirkwood, Mo., assignors to Monsanto Chemical Company, St. Louis, Mo., a corporation of Delaware No Drawing. Application January 11, 1954, Serial No. 403,434

10 Claims. (Cl. 260—586)

This invention relates to substituted naphthalenes. More specifically, this invention relates to 1-hydroxy-4-keto-2-alkoxy-4a-methyl - 1,4,4a,5,8,8a - hexahydronaphthalene having the following formula

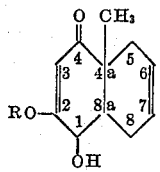

where R represents an alkyl radical containing from 1 to 5 carbon atoms, and to a method for their preparation. The novel compounds of this invention have exceptional utility as intermediates for the preparation of various organic chemicals, as for example sulfonic acid esters of the structural formula

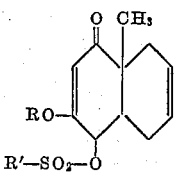

where R is an alkyl radical containing 1 to 5 carbon atoms and where R' is an aromatic hydrocarbon radical such as phenyl, tolyl, ethylphenyl, cumyl, naphthyl, etc. These sulfonic acid esters are useful as plasticizers for cellulose nitrate and may be prepared by condensing a 1-hydroxy-4-keto-2-alkoxy-4a-methyl-1,4,4a,5,8,8a - hexahydronaphthalene and a sulfonyl chloride of the formula R'—SO₂—Cl where R' has the significance as aforedescribed employing pyridine as a solvent. Additionally these sulfonic acid esters are useful in preparing intermediates for the synthesis of steroids, for example the trans isomers (which are obtained from the corresponding trans isomers of 1-hydroxy-4-keto-2-alkoxy-4a-methyl-1,4,4a,5,8,8a-hexahydronaphthalene as aforenoted) upon reductive deacylation with lithium aluminum hydride (1 to 3 molar proportions of the latter to 1 of the former) and hydrolyzing the intermediate complex so formed by treatment with aqueous mineral acid provide for the corresponding trans-2-keto-4a-methyl-1,2,4a,5,8,8a-hexahydronaphthalene

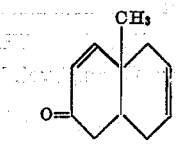

It will be obvious to those skilled in the art that the novel compounds of this invention contain three optically active carbon atoms. As a result thereof, these compounds may exist in eight optically active isomeric forms and four racemates. All such forms of the compounds described above are contemplated as coming within the scope of this invention. The terms "cis" and "trans" as used in this specification indicate the spacial position of the CH₃ group and H at positions 4a and 8a in the structural formula set forth above.

The novel compounds of this invention may be prepared by reacting a mixture comprising zinc, acetic acid and a 1,4-diketo-2-alkoxy-4a-methyl-1,4,4a,5,8,8a-hexahydronaphthalene, wherein the alkoxy group contains from 1 to 5 carbon atoms. The following examples are illustrative of the novel compounds of this invention and their method of preparation:

Example I

To a solution of 50.0 g. of dl-trans-1,4-diketo-2-methoxy-4a-methyl-1,4,4a,5,8,8a - hexahydronaphthalene in 162 ml. of water and 500 ml. of acetic acid, was added 100 g. of zinc dust at a temperature of 20°–25° C. The mixture was stirred at this temperature for approximately five hours and then filtered. The filter cake was washed with 100 ml. of methanol and the washings combined with the mother liquors obtained from the previously mentioned filtration. The combined mother liquors and washings were then reduced to about one-third their original volume by distillation under reduced pressure. The concentrated residue remaining was then dissolved in a mixture of 150 ml. of chloroform and 150 ml. of water. The aqueous layer which separated was removed and extracted with two 50 ml. portions of chloroform and these chloroform extracts combined with the original chloroform layer. The combined chloroform solution was then washed with two 50 ml. portions of water, two 50 ml. portions of a 5% sodium carbonate solution and two 50 ml. portions of water. The washed solution was then dried over anhydrous sodium sulfate and the chloroform then removed by distillation under reduced pressure. After removal of the solvent, there remained 45.2 g. of dl-trans-1-hydroxy-4-keto-2-methoxy-4a-methyl-1,4,4a,5,8,8a - hexahydronaphthalene, which on recrystallization from petroleum ether (essentially n-hexane) had a melting point of 82°–83° C. and an analysis as follows:

|  | C | H | CH₃O |
|---|---|---|---|
| Calculated for C₁₂H₁₈O₃ | 69.21 | 7.74 | 14.90 |
| Found | 68.94 | 7.84 | 14.81 |

Example II

The procedure set forth in Example I is repeated using dl-cis-1,4-diketo-2-methoxy-4a-methyl-1,4,4a,5,8,8a-hexahydronaphthalene in place of the dl-trans-1,4-diketo-2-methoxy-4a-methyl - 1,4,4a,5,8,8a - hexahydronaphthalene. Substantially pure dl-cis-1-hydroxy-4-keto-2-methoxy-4a-methyl - 1,4,4a,5,8,8a - hexahydronaphthalene is obtained.

Example III

The procedure set forth in Example I is repeated using the following ingredients:

5.3 g. of d-trans-1,4-diketo-2-ethoxy-4a-methyl-1,4,4a,5,-8,8a-hexahydronaphthalene
50.0 g. of acetic acid
16.2 g. of water
10.0 g. of zinc Substantially pure d-trans-1-hydroxy-4-keto-2-ethoxy-4a-methyl - 1,4,4a,5,8,8a - hexahydronaphthalene is obtained.

Example IV

The procedure set forth in Example I is repeated using the following ingredients:

4.6 g. of *dl*-trans-1,4-diketo-2-propoxy-4a-methyl-1,4,4a,-5,8,8a-hexahydronaphthalene
42.0 g. of acetic acid
13.4 g. of water
8.4 g. of zinc Substantially pure *dl*-trans-1-hydroxy-4-keto-2-propoxy-4a-methyl - 1,4,4a,5,8,8a - hexahydronaphthalene is obtained.

Example V

The procedure set forth in Example I is repeated using the following ingredients:

1.2 g. of l-cis-1,4-diketo-2-butoxy-4a-methyl-1,4,4a,5,8,-8a-hexahydronaphthalene
20.0 g. of acetic acid
8.0 g. of water
4.4 g. of zinc Substantially pure l-cis-1-hydroxy-4-keto - 2 - butoxy-4a-methyl - 1,4,4a,5,8,8a - hexahydronaphthalene is obtained.

Example VI

The procedure set forth in Example I is repeated using the following ingredients:

1.3 g. of l-trans-1,4-diketo-2-pentoxy-4a-methyl-1,4,4a,5,-8,8a-hexahydronaphthalene
20.0 g. of acetic acid
8.0 g. of water
4.5 g. of zinc Substantially pure l-trans-1-hydroxy-4-keto-2-pentoxy-4a-methyl - 1,4,4a,5,8,8a - hexahydronaphthalene is obtained.

While the preceding examples have illustrated specific embodiments of this invention, substantial variation in the reactants and reaction conditions specified in these examples is possible without departing from the scope of this invention. As an example, the reduction reaction described may be carried out either in the absence or the presence of an inert organic solvent. Typical of the various solvents that may be utilized are benzene, toluene, aliphatic hydrocarbons, etc.

The temperature of the reaction may be varied over a wide range. Temperatures in the range of from about 10° C. to about 60° C. have been found to be particularly advantageous.

The quantities of reactants used in preparing the novel compounds of this process are also subject to substantial variation. Generally a considerable excess of zinc is employed inasmuch as the excess is recovered from the reaction mixture. From about 2 to about 20 equivalents of zinc for each equivalent weight of the 1,4-diketo-2-alkoxy-4a-methyl-1,4,4a,5,8,8a-hexahydronaphthalene can be employed. Mossy zinc, granular zinc or zinc dust can be used in this process, although zinc dust is preferred.

The quantity of acetic acid used in this process is governed principally by that amount which is necessary to provide a fluid reaction medium. Aqueous acetic acid is extremely useful in this reaction, producing particularly outstanding results. According to a preferred embodiment of this invention, aqueous acetic acid containing from about 1% to about 50% water, and preferably from about 1% to about 30% water is used in the reaction mixture. The use of aqueous acetic acid in the reaction mixture results in extremely high yields of the desired product and affords a greater convenience in the handling of the reaction mixture.

After the reaction is complete, the 1-hydroxy-4-keto-2-alkoxy - 4a - methyl-1,4,4a,5,8,8a-hexahydronaphthalene may be recovered from the reaction mixture by any convenient method. A particularly convenient procedure comprises extracting the 1-hydroxy-4-keto-2-alkoxy-4a-methyl-1,4,4a,5,8,8a-hexahydronaphthalene in a suitable organic solvent and recovering the substituted naphthalene therefrom.

This application is a continuation-in-part of co-pending application Serial No. 272,265, filed February 18, 1952, now abandoned.

What is claimed is:

1. As new chemical compounds, the trans isomers of 1-hydroxy-4-keto-2-alkoxy-4a-methyl-1,4,4a,5,8,8a - hexahydronaphthalene wherein said alkoxy group contains from 1 to 5 carbon atoms.

2. As a new chemical compounds the trans isomers of 1 - hydroxy - 4-keto-2-methoxy-4a-methyl-1,4,4a,5,8,8a-hexahydronaphthalene.

3. As a new chemical compound, the trans isomers of 1-hydroxy-4-keto-2-ethoxy-4a-methyl-1,4,4a,5,8,8a - hexahydronaphthalene.

4. As a new chemical compound, the trans isomers of 1-hydroxy-4-keto-2-propoxy-4a-methyl-1,4,4a,5,8,8a - hexahydronaphthalene.

5. As a new chemical compound, the trans isomers of 1-hydroxy-4-keto-2-butoxy-4a-methyl-1,4,4a,5,8,8a - hexahydronaphthalene.

6. As a new chemical compound, the trans isomers of 1-hydroxy-4-keto-2-pentoxy-4a-methyl-1,4,4a,5,8,8a - hexahydronaphthalene.

7. A process for the preparation of a trans-1-hydroxy-4-keto-2-alkoxy-4a-methyl-1,4,4a,5,8,8a - hexahydronaphthalene, wherein the alkoxy group contains from 1 to 5 carbon atoms, which comprises reacting zinc, aqueous acetic acid and a trans-1,4-diketo-2-alkoxy-4a-methyl-1,4,4a,5,8,8a-hexahydronaphthalene wherein the alkoxy group contains from 1 to 5 carbon atoms.

8. A process for the preparation of trans-1-hydroxy-4-keto-2-alkoxy-4a-methyl-1,4,4a,5,8,8a-hexahydronaphthalene, wherein the alkoxy group contains from 1 to 5 carbon atoms, which comprises reacting zinc dust, aqueous acetic acid and trans-1,4-diketo-2-alkoxy-4a-methyl-1,4,-4a,5,8,8a-hexahydronaphthalene wherein the alkoxy group contains from 1 to 5 carbon atoms, the said aqueous acetic acid containing about 1% to about 50% water.

9. A process for the preparation of *dl*-trans-1-hydroxy-4-keto-2-alkoxy-4a-methyl-1,4,4a,5,8,8a - hexahydronaphthalene, wherein the alkoxy group contains from 1 to 5 carbon atoms, which comprises reacting zinc dust, aqueous acetic acid and *dl*-trans-1,4-diketo-2-alkoxy-4a-methyl-1,4,4a-5,8,8a-hexahydronaphthalene wherein the alkoxy group contains from 1 to 5 carbon atoms at a temperature in the range of from about 10° C. to about 60° C., the said aqueous acetic acid containing about 1% to about 30% water.

10. As a new chemical compound *dl*-trans-1-hydroxy-4-keto-2-methoxy-4a-methyl - 1,4,4a,5,8,8a - hexahydronaphthalene.

References Cited in the file of this patent

UNITED STATES PATENTS 2,066,951    Schumacher _____ Jan. 5, 1937

OTHER REFERENCES

Orchin et al.: "J. Org. Chem.," vol. VIII, 1943, pages 509–514.